I. J. ORDWAY.
Tailor's Measure.

Patented Jan. 4, 1870.

I. J. ORDWAY.
Tailor's Measure.
No. 98,618.
3 Sheets—Sheet 2.
Patented Jan. 4, 1870.
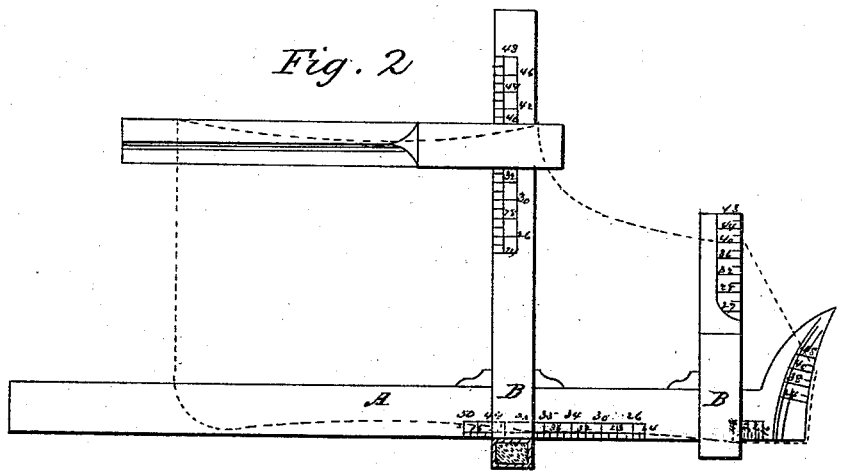
Fig. 2
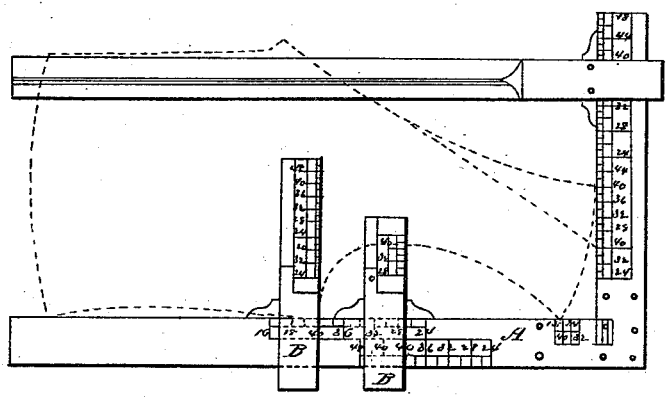
Witnesses:
Inventor:
Ira J. Ordway
by
his Attorney

I. J. ORDWAY.

Tailor's Measure.

Patented Jan. 4, 1870.

United States Patent Office.

IRA J. ORDWAY, OF WEST EDMESTON, NEW YORK.

Letters Patent No. 98,618, dated January 4, 1870.

IMPROVEMENT IN DEVICES FOR MEASURING AND LAYING OUT GARMENTS.

The Schedule referred to in these Letters Patent and making part of the same.

To all whom it may concern:

Be it known that I, IRA J. ORDWAY, of West Edmeston, in the county of Otsego, and State of New York, have invented a new and improved Apparatus for Draughting Clothes; and I do hereby declare that the following is a full, clear, and exact description of the construction and operation of the same, reference being had to the accompanying drawings, making a part of this specification, in which—

Figure 2 is a plan view of the apparatus for draughting vests; and

Figure 1:
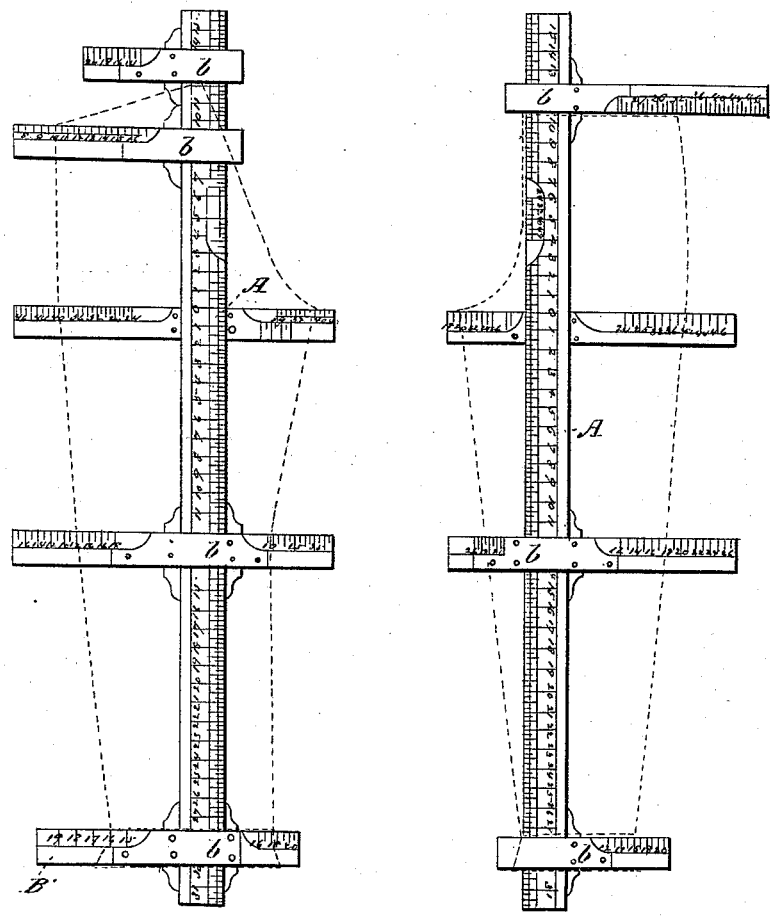
Figure 1 is a plan view of the apparatus for draughting pantaloons.
Figure 3:
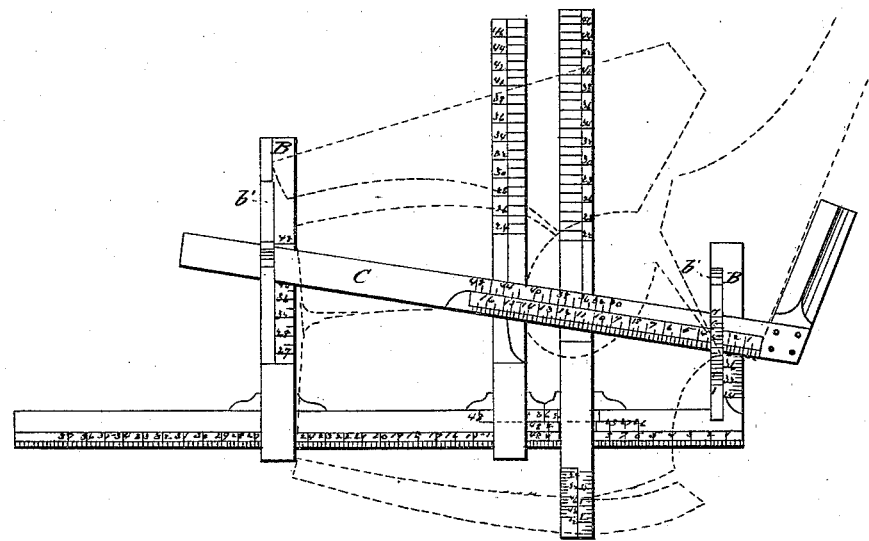
Figure 3 is a plan view of the apparatus for draughting coats.
Figure 3:
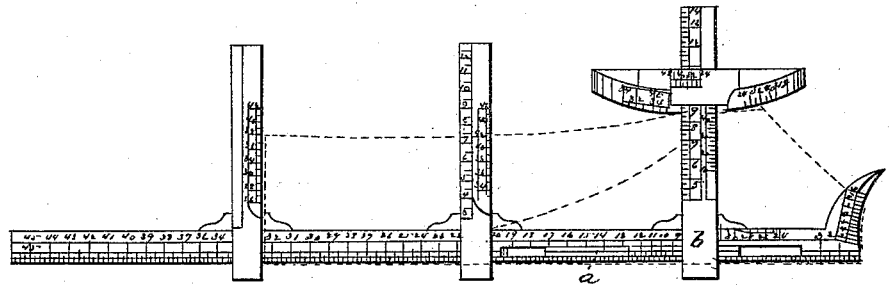

This invention consists in combining with a main linear measuring-stick, for laying off dimensions of length of the subject ordering new clothes, other measuring-sticks, perpendicular to the main stick, or inclined to it, and intended for the purpose of laying off dimensions of width, or of inclined or curved length, such combination being effected by means of sockets in the ends of transverse sticks, through which the main stick passes, the sockets being so packed with rubber or other elastic material as to be always self-supporting, and yet allowing the easy movement of the transverse wands upon the main wand, or by means of spring-arms placed lengthwise of the transverse sticks, and holding, with like grasp, the inclined wands, the whole being arranged so as to lay off points from the several measurements upon paper or cloth, by which points correct patterns or garments may be cut.

In the drawings—

A is the main rule, for ascertaining measures of length.

B B', &c., are the transverse rules, placed on the main rule, at right angles with the latter.

The transverse rules have sockets, made by bands b b, passing on each side of the main rule, and having rubber or other packing of an elastic nature, which so connects the rules that the transverse ones, B, may be moved with ease, and yet stop and remain at precisely the point where the hand of the operator leaves them.

The rules B are thus self-supporting at all points.

A similar socket connects the transverse rules B with the inclined rule C, used for giving the measurements of the arm-holes.

Spring-arms b', placed lengthwise of the transverse rule, and at a distance from them less than the thickness of the stick C, serve to hold it in whatever position it is left in, while allowing it sufficiently easy movement.

In fig. 2, a groove, a, is shown, made lengthwise of the upper side of the main rule A, within which groove is a bar, a', passing under the band b, and sliding with the transverse rule B.

The main rule A is graduated in inches and parts of inches.

On the other rule, scales are inscribed, which give the proper widths.

It should be understood that this scale is not intended for application to the person of the subject, but only for laying off the measurements on the person, made by ordinary means, upon paper or cloth.

If, for instance, the distance from the subject's hip to his knee be found to be twelve inches, and to his ankle twenty-eight, the operator places the transverse rule B at 12 of the main scale, fig. 1, and the wand B' at 28 of the main scale. Then, if his horizontal knee-measure is eighteen inches, and his horizontal bottom-measure is sixteen inches, lines drawn on the cloth from sixteen of rule B' to 18 of rule B, on both sides of main rule A, give the proper directions. The same rule holds throughout. Hence, I say the figures of the main rule are the results to be obtained on the transverse rules.

This apparatus is applicable to various systems and garments.

The scales made for breast, hip, or other parts, have the actual measurements carried with them, making a double entry, or twofold method of obtaining points, and detecting errors.

Having thus described my invention,

What I claim as new, and desire to secure by Letters Patent, is—

The main rule A, combined with the transverse rules B and inclined rule C, substantially as and for the purpose specified.

To the above specification of my improvement, I have set my hand, this 29th day of September, 1869.

IRA J. ORDWAY.

Witnesses:
CHAS. A. PETTIT,
S. C. KEMON.